(12) United States Patent
Hong et al.

(10) Patent No.: US 9,480,388 B2
(45) Date of Patent: Nov. 1, 2016

(54) HOUSEHOLD APPLIANCE HAVING DRYING DUCT

(75) Inventors: Seung Gee Hong, Suwon-si (KR); Woo Jin Shin, Suwon-si (KR); Jae Man Joo, Suwon-si (KR); Young Hwan Ko, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1252 days.

(21) Appl. No.: 13/067,680

(22) Filed: Jun. 20, 2011

(65) Prior Publication Data

US 2012/0055519 A1    Mar. 8, 2012

(30) Foreign Application Priority Data

Jun. 23, 2010    (KR) .................. 10-2010-0059674

(51) Int. Cl.
*A47L 15/48*    (2006.01)
*D06F 58/24*    (2006.01)
*D06F 58/20*    (2006.01)

(52) U.S. Cl.
CPC ............ *A47L 15/481* (2013.01); *A47L 15/488* (2013.01); *A47L 15/483* (2013.01); *D06F 58/20* (2013.01); *D06F 58/24* (2013.01)

(58) Field of Classification Search
CPC . A47L 15/481; A47L 15/483; A47L 15/486; A47L 15/488
USPC .................. 134/57 D, 56 D, 58 D; 34/80
See application file for complete search history.

(56) References Cited

U.S. PATENT DOCUMENTS

| 4,421,702 A * | 12/1983 | Oda et al. ............... 264/631 |
| 2009/0158928 A1* | 6/2009 | Wu et al. .................. 95/115 |

FOREIGN PATENT DOCUMENTS

| CN | 1829465 A | 9/2006 |
| CN | 1889883 A | 1/2007 |
| CN | 1016571396 A | 2/2010 |
| DE | 2252668 A * | 5/1974 |
| DE | 3626887 | 2/1988 |
| DE | 19718047 A1 * | 11/1998 | ............ B60H 3/024 |
| EP | 1 674 029 A1 | 6/2006 |

(Continued)

OTHER PUBLICATIONS

Machine translation of EP 1674030 A1, dated Jun. 2006.*

(Continued)

*Primary Examiner* — Joseph L Perrin
*Assistant Examiner* — Kevin G Lee
(74) *Attorney, Agent, or Firm* — Staas & Halsey LLP

(57) ABSTRACT

A drying duct and a household appliance having the same. The household appliance includes a main body, a drying space placed in the main body and including an air suction hole and an air drain hole, a drying duct including at least one inside-air suction hole communicating with the air drain hole, an inside-air discharge hole communicating with the air suction hole, and an outside-air suction hole and an outside-air discharge hole communicating with the outside of the drying space, and at least one dehumidifying agent placed in the drying duct. The drying duct includes an inside-air suction path into which air inside of the drying space is suctioned, an outside-air suction path into which air outside of the drying space is suctioned, and an inside/outside air movement path communicating with the inside-air suction path and the outside-air suction path.

15 Claims, 15 Drawing Sheets

(56) References Cited

FOREIGN PATENT DOCUMENTS

| EP | 1674030 A1 | * | 6/2006 |
|---|---|---|---|
| EP | 2 301 409 A1 | | 3/2011 |
| FR | 2712899 A1 | * | 6/1995 |
| GB | 2 284 164 A | | 5/1995 |
| JP | 08-098797 | | 4/1996 |
| JP | 2004-195098 | | 7/2004 |
| JP | 2005-034523 | | 2/2005 |
| JP | 2006-020753 | | 1/2006 |
| JP | 2009178231 A | * | 8/2009 |
| KR | 10-2004-0071246 | | 8/2004 |
| KR | 10-2005-0110859 | | 11/2005 |

OTHER PUBLICATIONS

Galileo Mission Director Status Report, dated Mar. 13-19, 1992 (available at http://files.seds.org/pub/spacecraft/GALILEO/gs03.13-19.92).*
Machine translation of DE3626887 A1, dated Feb. 1988.*
Machine translation of JP2009178231A, dated Aug. 2009.*
Chinese Office Action issued May 16, 2014 in corresponding Chinese Patent Application 201110133033.X.
European Search Report dated Jan. 5, 2015 issued in corresponding European Patent Application 11163831.8.
European Decision to Grant dated Feb. 4, 2016 in corresponding European Patent Application No. 11 162 831.8.

* cited by examiner

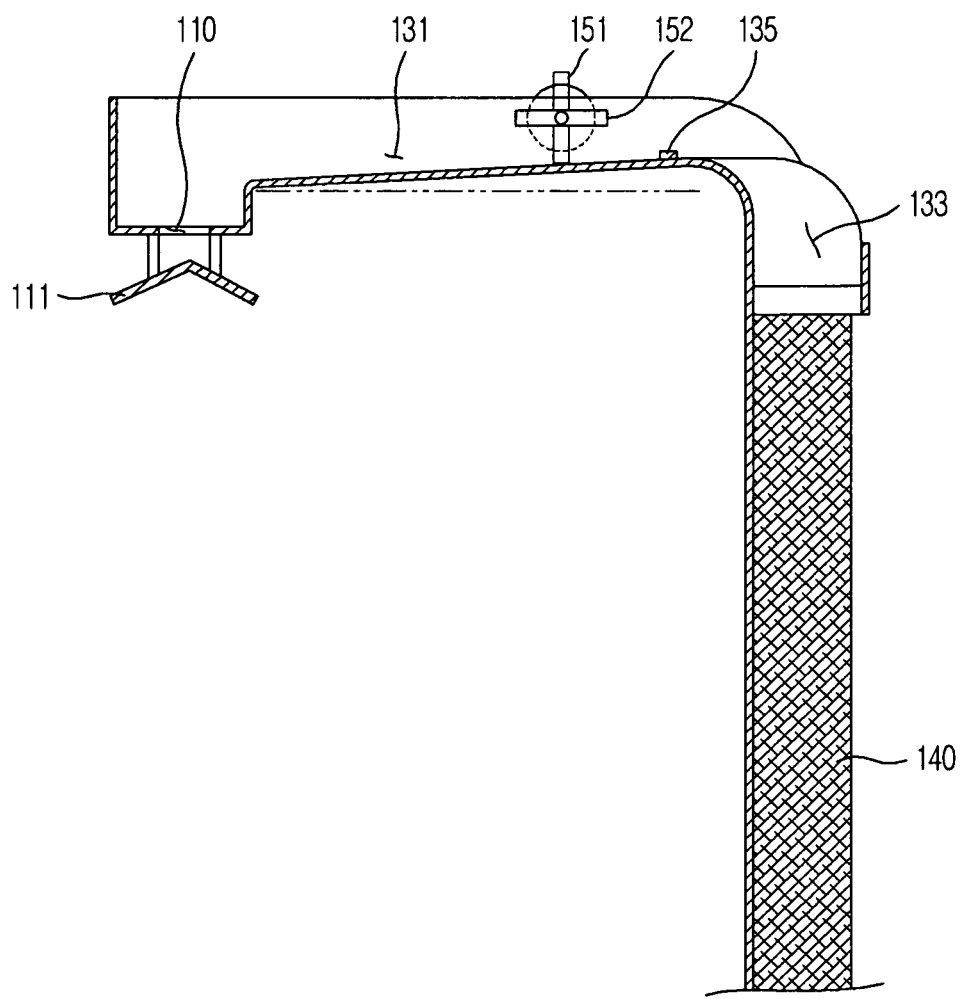

HOUSEHOLD APPLIANCE HAVING DRYING DUCT

CROSS-REFERENCE TO RELATED APPLICATIONS

This application claims the priority benefit of Korean Patent Application No. 2010-0059674, filed on Jun. 23, 2010 in the Korean Intellectual Property Office, the disclosure of which is incorporated herein by reference.

BACKGROUND

1. Field

Embodiments relate to a household appliance having a drying duct, which may reduce energy consumption and improve drying performance.

2. Description of the Related Art

In general, use of household appliances that implement a dying function, such as a dishwasher, washing machine, drying machine, etc., is increasing. A dishwasher has a drying function to remove wash water remaining on surfaces of completely washed dishes, and a washing or drying machine has a drying function to dry wet laundry.

For example, a dishwasher is a household appliance enabling sanitary and efficient dish washing, and functions to wash dirty dishes and dry the washed dishes. A drying process of removing water remaining on completely washed dishes is executed by the dishwasher. The drying process is divided into a vaporization process in which higher temperature water is applied to dishes at a final rinsing stage to raise the temperature of dishes and thus, facilitate vaporization of water remaining on the dishes, and a dehumidifying process in which water vapor condenses in a cooling duct located outside or inside of a wash tub, or is absorbed into a dehumidifying agent.

Using a dehumidifying agent for removal of water vapor may necessitate a regeneration process of drying the dehumidifying agent to allow the dehumidifying agent to again absorb water vapor during a following drying process. Conventionally, a method of heating a dehumidifying agent using a heater during a washing or rinsing process has been used. In this conventional method, a heater is used to heat the dehumidifying agent so as to vaporize water from the dehumidifying agent, allowing the regenerated dehumidifying agent to again absorb water vapor in a following drying process.

In general, a dishwasher uses a porous dehumidifying agent. The porous dehumidifying agent receives water or water vapor absorbed therein. Regeneration of the porous dehumidifying agent may necessitate energy (vaporization heat) to change water received in the pores into water vapor and further energy to allow the water vapor to escape from the pores. Thus, the high energy demands of the dehumidifying agent regeneration process may result in excessive energy consumption.

In addition, increasing the amount or volume of the porous dehumidifying agent to assure drying performance may reduce a washing space in which dish washing is performed.

SUMMARY

Therefore, it is an aspect to provide a household appliance having a drying duct.

Additional aspects of the invention will be set forth in part in the description which follows and, in part, will be apparent from the description, or may be learned by practice of the invention.

In accordance with one aspect, a household appliance includes a main body, a drying space placed in the main body and including an air suction hole and an air drain hole, a drying duct including at least one inside-air suction hole communicating with the air drain hole, an inside-air discharge hole communicating with the air suction hole, and an outside-air suction hole and an outside-air discharge hole communicating with the outside of the drying space, and at least one dehumidifying agent placed in the drying duct, wherein the drying duct includes an inside-air suction path into which air inside of the drying space is suctioned, an outside-air suction path into which air outside of the drying space is suctioned, and an inside/outside air movement path communicating with the inside-air suction path and the outside-air suction path.

The air drain hole may be formed at an upper surface of the drying space, and the air suction hole may be formed at a left or right surface of the drying space.

The inside/outside air movement path may be located at the outside of the left or right surface of the drying space.

The dehumidifying agent may be placed in the inside/outside air movement path.

The household appliance may further include a heater to heat the outside air suctioned into the drying duct.

The heater may be placed in the outside-air suction path.

The heater may be located near an entrance of the outside-air suction path.

The heater may be placed in the inside/outside air movement path.

The household appliance may further include a suction path change device to selectively communicate any one of the inside-air suction path and the outside-air suction path with the inside/outside air movement path.

The suction path change device may include an inside-air suction path shutter including a shutter surface corresponding to a cross section of the inside-air suction path, and an outside-air suction path shutter including a shutter surface corresponding to a cross section of the outside-air suction path, and the inside-air suction path shutter and the outside-air suction path shutter may be connected to each other on a single shaft to have a predetermined angle therebetween.

The household appliance may further include a discharge path change device to guide air to the inside-air discharge hole during a drying process and to the outside-air discharge hole during a regeneration process.

A lower surface of the inside-air suction path may be inclined downward by a predetermined angle toward the at least one inside-air suction hole.

The household appliance may further include a water-flow preventing protrusion formed in the inside-air suction path to prevent water from moving from the inside-air suction path to the inside/outside air movement path.

In accordance with another aspect, a dishwasher including a main body, a wash tub provided in the main body, a drying duct including at least one inside-air suction hole and an inside-air discharge hole communicating with the interior of the wash tub, and an outside-air suction hole and an outside-air discharge hole communicating with the outside of the wash tub, and at least one dehumidifying agent placed in the drying duct, wherein the drying duct internally defines a path communicating with the at least one inside-air suction hole such that air inside of the wash tub is suctioned thereinto, and a path communicating with the outside-air suction hole such that air outside of the wash tub is suctioned thereinto. The outside-air suction hole may be configured to allow the air outside of the wash tub to be suctioned into the drying duct along an outer surface of the main body.

The at least one inside-air suction hole may communicate with an upper surface of the wash tub, and the inside-air discharge hole may communicate with a left or right surface of the wash tub.

The drying duct may further include a suction section located at an outer upper portion of the drying space such that air is suctioned into the suction section, and the inside-air suction path and the outside-air suction path may be located in the suction section.

The at least one inside-air suction hole may include a plurality of inside-air suction holes formed at the drying duct.

The dishwasher may further include a circulating fan mounted in the drying duct, and the circulating fan may be located between a lower surface of the wash tub and a bottom surface of the main body.

The dishwasher may further include a heater to heat outside air suctioned into the drying duct.

The dishwasher may further include a water-intercepting member connected to the at least one inside-air suction hole to prevent wash water from entering the drying duct.

The dehumidifying agent may be a stack of dehumidifying sheets made out of a high molecular weight material.

An average velocity of air passing through the dehumidifying agent may be approximately 0.7 m/s or more.

The heater may be operated after a predetermined time passes from a regeneration beginning time.

The heater may be located near the outside-air suction hole.

A temperature of air heated by the heater may be approximately 70° C. or less.

In accordance with another aspect, a dishwasher includes a main body, a wash tub placed in the main body and having an air suction hole and an air drain hole, a drying duct having at least one inside-air suction hole communicating with the air drain hole, an inside-air discharge hole communicating with the air suction hole, and an outside-air suction hole and an outside-air discharge hole communicating with the outside of the wash tub, at least one dehumidifying agent to remove moisture from air suctioned into the at least one inside-air suction hole, an inside-air suction path defined in the drying duct so as to communicate with the at least one inside-air suction hole, an outside-air suction path defined in the drying duct so as to communicate with the outside-air suction hole, and a partition to guide movement of air suctioned into the drying duct, wherein the partition is placed between the inside-air suction path and the outside-air suction path.

In accordance with a further aspect, a dishwasher includes a main body, a wash tub placed in the main body and having an air suction hole and an air drain hole, a drying duct having at least one inside-air suction hole communicating with the air drain hole, an inside-air discharge hole communicating with the air suction hole, and an outside-air suction hole and an outside-air discharge hole communicating with the outside of the wash tub, at least one dehumidifying agent to remove moisture from air suctioned into the at least one inside-air suction hole, an inside-air suction path communicating with the at least one inside-air suction hole such that air inside of the wash tub is suctioned thereinto, and an outside-air suction path communicating with the outside-air suction hole such that air outside of the wash tub is suctioned thereinto, wherein the drying duct includes a base defining a lower surface, a cover defining an upper surface, and a partition to divide an interior space defined by the base and the cover, wherein the inside-air suction path and the outside-air suction path are defined in the interior space, and wherein the inside-air suction path and the outside-air suction path have at least one of the base and the partition in common.

BRIEF DESCRIPTION OF THE DRAWINGS

These and/or other aspects of the invention will become apparent and more readily appreciated from the following description of the embodiments, taken in conjunction with the accompanying drawings of which:

FIG. 4 is a sectional view of the drying duct taken along the line A-A' of FIG. 3B;

DETAILED DESCRIPTION

Figure 1:
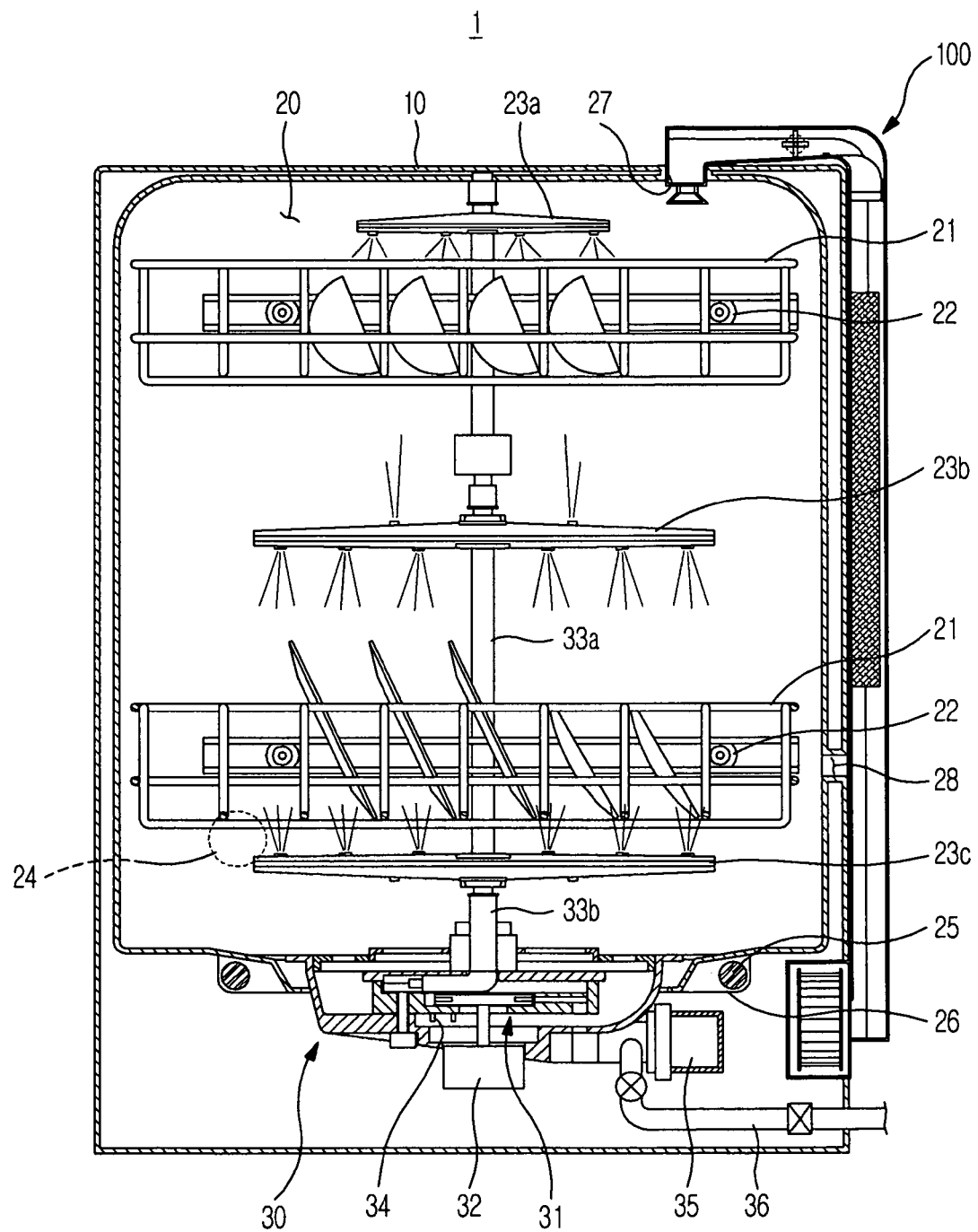
FIG. 1 is a view illustrating main components of a dishwasher according to an embodiment.

Reference will now be made in detail to the embodiments, examples of which are illustrated in the accompanying drawings, and wherein like reference numerals refer to like elements throughout. The embodiments are applicable to all kinds of household appliances having a drying duct to dry a drying space. Here, a drying space is a space in which a drying process is performed. Examples of the drying space include a wash tub provided in a dishwasher for washing dishes, a wash tub provided in a washing machine for washing laundry, and a drying chamber provided in a drying machine. Hereinafter, a dishwasher will be described by way of example.

FIG. 1 is a view illustrating main components of a dishwasher according to an embodiment.

As illustrated in FIG. 1, the dishwasher 1 includes a main body 10, a wash tub 20 provided in the main body 10 to define a washing space, and a sump 30 provided at the bottom of the wash tub 20 to store wash water.

The wash tub 20 includes at least one dish basket 21 in which dishes are received, at least one rack 22 to support the at least one dish basket 21 in a sliding movable manner, and at least one ejection nozzle 23 to eject wash water. Here, the at least one ejection nozzle 23 may include a top nozzle 23a, an upper nozzle 23b, and a lower nozzle 23c.

The wash tub 20 may be provided with a water supply portion 24 for supply of wash water. The water supply portion 24 may be provided at a sidewall of the wash tub 20. Wash water may be supplied into the wash tub 20 through the water supply portion 24.

A heater 25 to heat wash water and a heater installation recess 26 may be provided in the main body 10. The heater installation recess 26 may be located immediately below the wash tub 20, and the heater 25 may be received in the heater installation recess 26.

The sump 30 may be provided at the bottom center of the wash tub 20 and be configured to collect and pump wash water.

The sump 30 may include a wash pump 31 to pump wash water at a high pressure and a pump motor 32 to drive the wash pump 31. The wash pump 31 may pump wash water to the top nozzle 23a and the upper nozzle 23b through a first supply pipe 33a and to the lower nozzle 23c through a second supply pipe 33b.

The sump 30 may include a turbidity sensor 34 to detect the level of dirtiness of wash water. A control unit (not shown) of the dishwasher 1 may detect the level of dirtiness of wash water using the turbidity sensor 34, thereby controlling the implementation number of a washing or rinsing process. For example, the implementation number of a washing or rinsing process may be increased in proportion to the level of dirtiness of wash water.

A drain pump 35 and a drain pipe 36 may be installed at one side of the sump 30 to discharge dirty wash water out of the dishwasher 1.

After washing dishes is completed, a drying process is performed to remove wash water remaining in the wash tub 20.

To this end, the dishwasher 1 includes a drying duct 100 to dry the interior of the wash tub 20.

Figure 2:
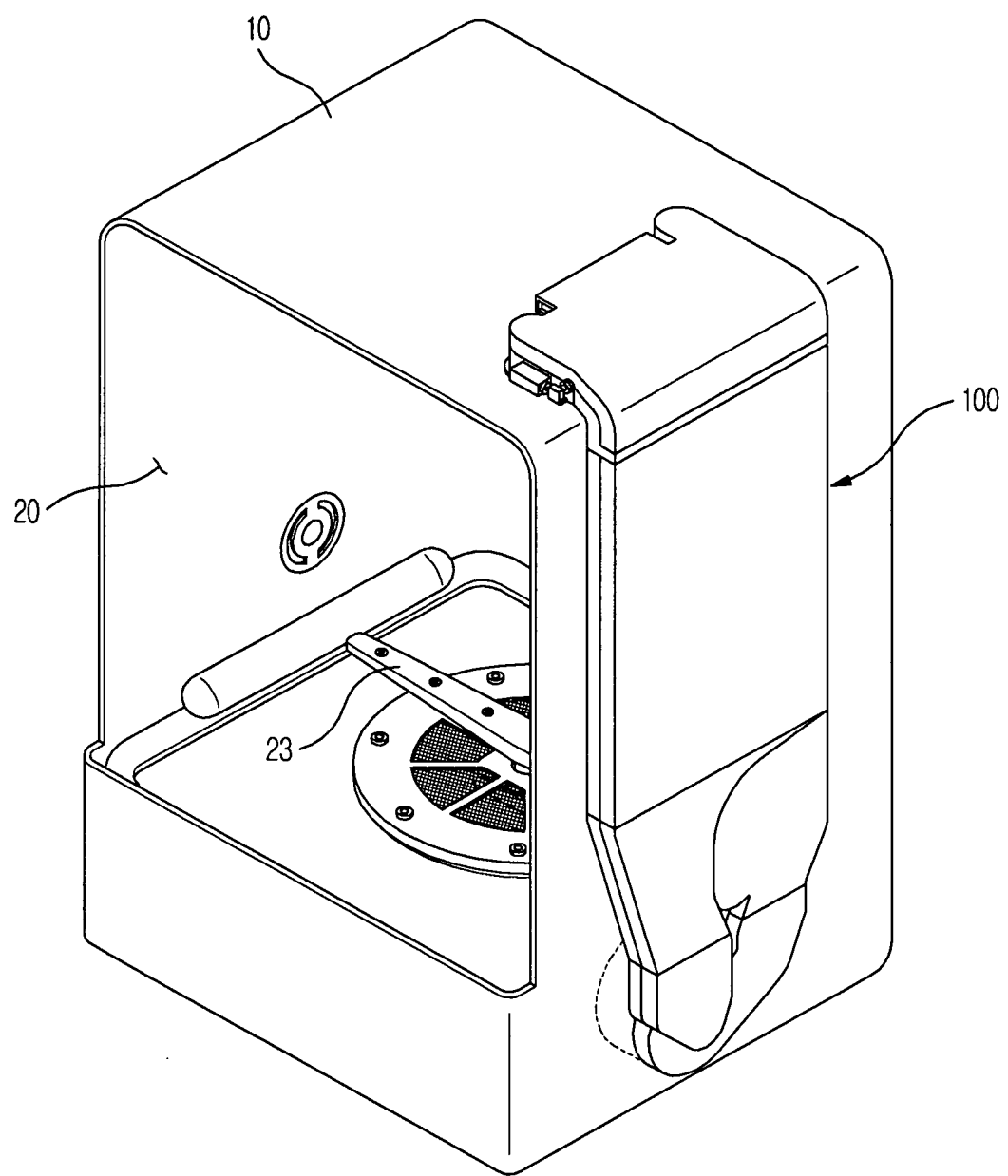
FIG. 2 is a perspective view illustrating the exterior of a drying duct provided in the dishwasher according to the embodiment.
Figure 3A:
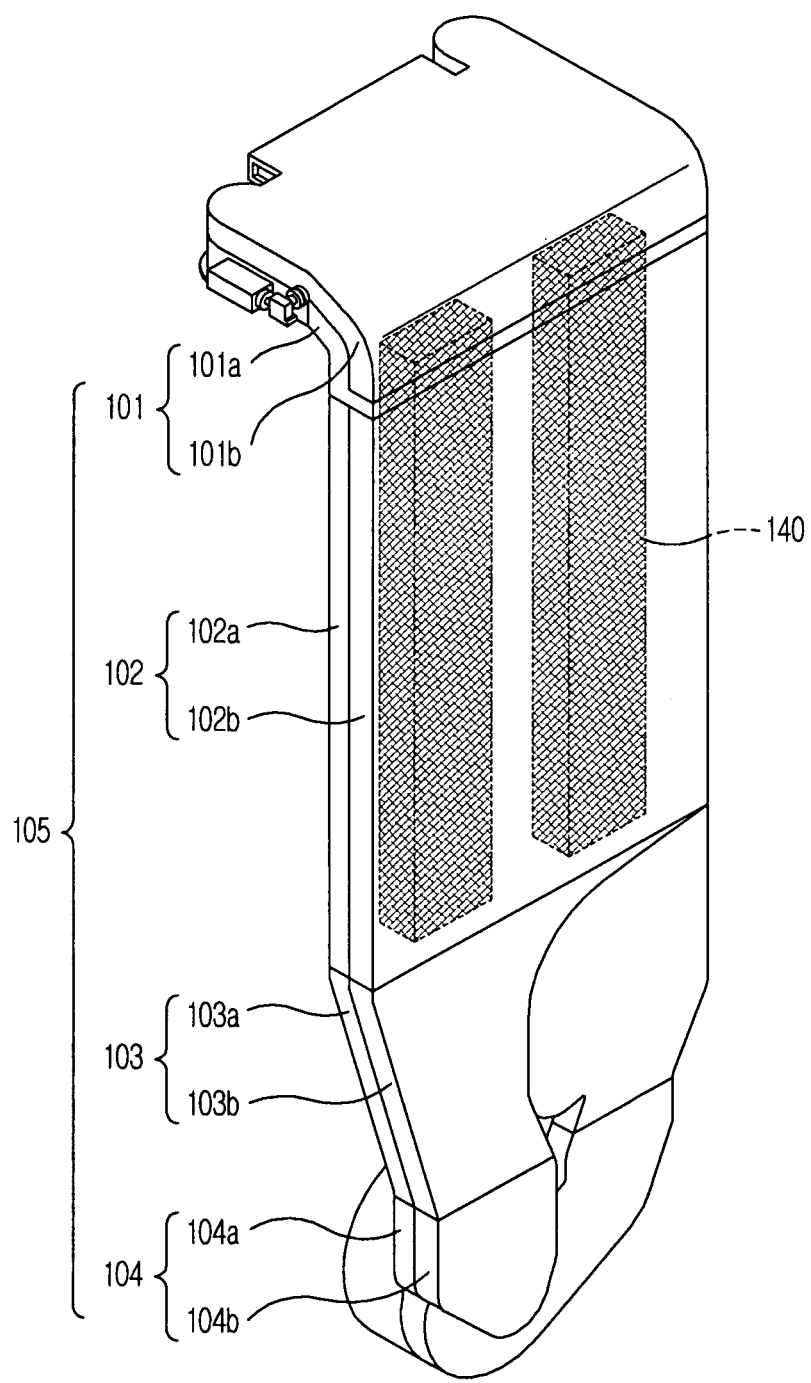
FIG. 3A is a perspective view illustrating the exterior of the drying duct according to the embodiment.
Figure 3B:
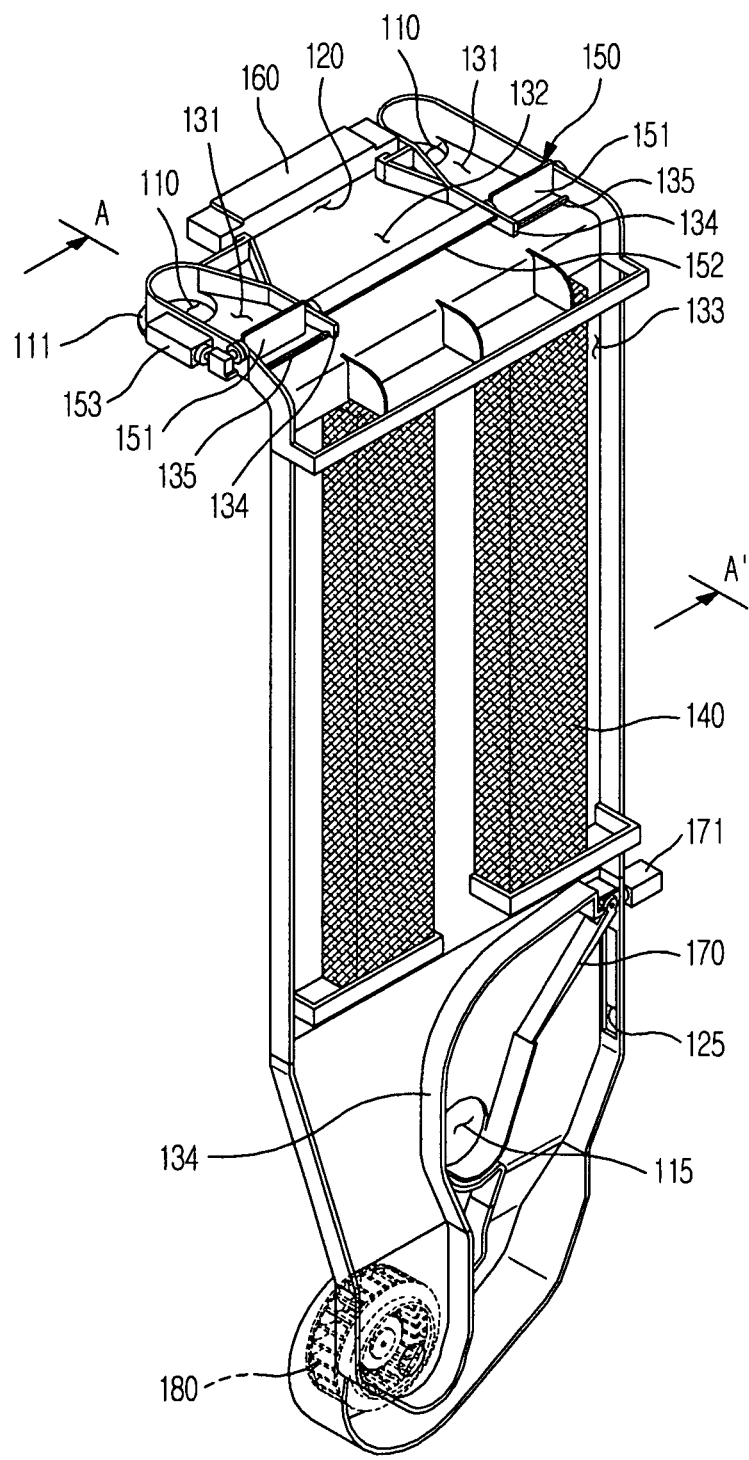
FIG. 3B is a perspective view illustrating the interior of the drying duct according to the embodiment.
Figure 5A:
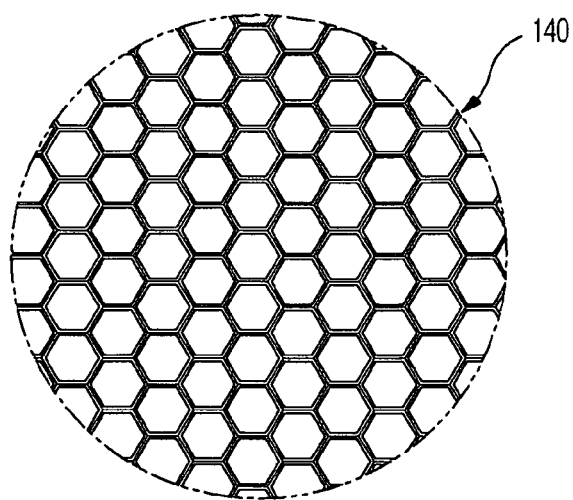
FIG. 5A is an enlarged sectional view of a dehumidifying agent used in the dishwasher according to the embodiment.
Figure 5B:
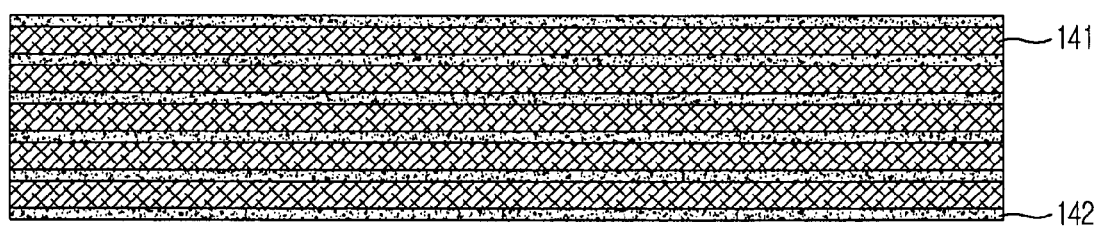
FIG. 5B is a view illustrating a dehumidifying agent in which a heating member is interposed between dehumidifying sheets used in the dishwasher according to the embodiment.

FIG. 2 is a perspective view illustrating the exterior of the drying duct provided in the dishwasher according to the embodiment. FIG. 3A is a perspective view illustrating the exterior of the drying duct according to the embodiment, and FIG. 3B is a perspective view illustrating the interior of the drying duct according to the embodiment. FIG. 4 is a sectional view of the drying duct taken along the line A-A' of FIG. 3B. Also, FIG. 5A is an enlarged sectional view of a dehumidifying agent used in the dishwasher according to the embodiment, and FIG. 5B is a view illustrating a dehumidifying agent in which a heating member is interposed between dehumidifying sheets used in the dishwasher according to the embodiment.

As illustrated in FIG. 2, the drying duct 100 is disposed at the outside of the wash tub 20. At least one dehumidifying agent 140 is mounted in the drying duct 100 and serves to absorb moisture contained in air. The drying duct 100 includes a case 105 defining the external appearance of the drying duct 100. The case 105 may include a suction section 101 through which air inside or outside of the wash tub 20 is suctioned, a drying section 102 in which the dehumidifying agent 140 is located, a discharge section 103 through which air having passed through the drying section 102 is discharged into or out of the wash tub 20, and a blowing section 104 to enable movement of air within the drying duct 100. In this case, each section 101, 102, 103, or 104 may be divided into a base 101a, 102a, 103a, or 104a and a cover 101b, 102b, 103b, or 104b, respectively. A partition is disposed in a space defined by the base 101a, 102a, 103a, or 104a and the cover 101b, 102b, 103b, or 104b, respectively.

The partition serves to define air paths to guide flow of air. Although the drying duct 100 is divided into the plurality of sections 101, 102, 103 and 104, two or more sections may be combined into a single section, or all the sections may be integrated into one. Defining the air paths using the partition disposed in the drying duct 100 may prevent the air paths from being exposed to the outside of the drying duct 100. This may provide the drying duct 100 with reduced size and enhanced space utilization.

Air inside of the wash tub 20 containing water vapor is suctioned into the drying duct 100, and after the water vapor in the air received in the drying duct 100 is removed by the dehumidifying agent 140, the air in the drying duct 100 is discharged into the wash tub 20. To enable suction or discharge of the air from or into the wash tub 20, the drying duct 100 includes at least one inside-air suction hole 110 and an inside-air discharge hole 115.

Also, air outside of the wash tub 20 is suctioned into the drying duct 100, and after being used to dry the dehumidifying agent 140 to enable reuse of the dehumidifying agent 140, the air in the drying duct 100 is discharged out of the wash tub 20. To enable suction or discharge of the air outside of the wash tub 20, the drying duct 100 includes an outside-air suction hole 120 and an outside-air discharge hole 125.

The at least one inside-air suction hole 110 communicates with the interior of the wash tub 20. In a drying process, air inside of the wash tub 20 containing water vapor is suctioned into the drying duct 100 through the at least one inside-air suction hole 110. The wash tub 20 includes an air drain hole 27 at a position corresponding to the at least one inside-air suction hole 110. The air drain hole 27 may be formed at the top of the wash tub 20. A plurality of inside-air suction holes 110 may be provided as necessary to assure efficient suction of air inside of the wash tub 20.

The at least one inside-air suction hole 110 is connected to a water-intercepting member 111 to prevent wash water from entering the drying duct 100. The water-intercepting member 111 has a shape corresponding to the at least one inside-air suction hole 110 and is spaced apart from the at least one inside-air suction hole 110 by a predetermined distance.

The air, from which water vapor has been removed by the dehumidifying agent 140, is discharged into the wash tub 20 through the inside-air discharge hole 115. The inside-air discharge hole 115 communicates with the interior of the wash tub 20. The wash tub 20 includes an air suction hole 28 at a position corresponding to the inside-air discharge hole 115. The inside-air discharge hole 115 may be formed at a left or right surface of the wash tub 20.

The outside-air suction hole 120 and the outside-air discharge hole 125 are formed to communicate with the outside of the wash tub 20, more particularly, with the outside of the main body 10. Air outside of the wash tub 20 is suctioned into the drying duct 100 through the outside-air suction hole 120 and is again discharged out of the wash tub 20 through the outside-air discharge hole 125. While the outside air passes through the drying duct 100, the outside air absorbs and removes moisture from the dehumidifying agent 140 received in the drying duct 100, thereby regenerating the dehumidifying agent 140.

The outside-air suction hole 120 may be located near the at least one inside-air suction hole 110, and the outside-air discharge hole 125 may be located near the inside-air discharge hole 115. The positions of the outside-air suction hole 120 and the outside-air discharge hole 125 are not limited thereto, and may be determined such that the dehumidifying agent 140 is located between the outside-air suction hole 120 and the outside-air discharge hole 125 to assure regeneration of the dehumidifying agent 140 to use the air outside of the wash tub 20.

The outside-air suction hole 120 may be configured to allow the outside air to be introduced into the drying duct 100 along an outer surface of the main body 10. If the dishwasher 1 is of a built-in type, the outside air is introduced through a gap between the dishwasher 1 and a receiving space for the dishwasher 1. If the outside-air suction hole 120 extends orthogonally to a longitudinal direction of the outer surface of the main body 10, the drying duct 100 may suffer deteriorated air suction efficiency. Therefore, the outside-air suction hole 120 is configured to allow air to be suctioned into the drying duct 100 in a direction parallel to the outer surface of the main body 10. That is, the outside-air suction hole 120 may be open in a direction parallel to the longitudinal direction of the outer surface of the main body 10.

Similar to the outside-air suction hole 120, the outside-air discharge hole 125 may be open in a direction parallel to the longitudinal direction of the outer surface of the main body 10 so as to assure efficient discharge of air out of the wash tub 20.

The drying duct 100 includes an inside-air suction path 131 into which air inside of the wash tub 20 is drawn, an outside-air suction path 132 into which air outside of the wash tub 20 is drawn, and an inside/outside air movement path 133 along which the air inside and outside of the wash tub 20 moves. The at least one inside-air suction hole 110 is an entrance of the inside-air suction path 131, and the outside-air suction hole 120 is an entrance of the outside-air suction path 132. Both exits of the inside-air suction path 131 and the outside-air suction path 132 are connected to an entrance of the inside/outside air movement path 133.

The inside-air suction path 131 and the outside-air suction path 132 are located in a space defined by the base and the cover. In this case, inner walls of the inside-air suction path 131 and the outside-air suction path 132 may include at least any one of the base and a partition 134 in common. For example, the partition 134 is arranged between the inside-air suction path 131 and the outside-air suction path 132, and lower surfaces of the inside-air suction path 131 and the outside-air suction path 132 may be formed by the base.

The inside-air suction path 131 and the outside-air suction path 132 may include the suction section 101 of the drying duct 100. In this case, the lower surfaces of the inside-air suction path 131 and the outside-air suction path 132 are formed by the base 101a of the suction section 101. The inside-air suction path 131 and the outside-air suction path 132 are separated from each other by the partition 134.

The inside-air suction path 131 and the outside-air suction path 132 are located on an upper outer surface of the wash tub 20, and the inside/outside air movement path 133 is located on a left or right outer surface of the wash tub 20. Air inside of the wash tub 20 circulates in sequence through the at least one inside-air suction hole 110, the inside-air suction path 131, the inside/outside air movement path 133, and the inside-air discharge hole 115. Also, air outside of the wash tub 20 circulates in sequence through the outside-air suction hole 120, the outside-air suction path 132, the inside/outside air movement path 133, and the outside-air discharge hole 125.

The air inside of the wash tub 20 contains water vapor and therefore, may condense while passing through the inside-air suction path 131. If condensed water is introduced into the inside/outside air movement path 133 and is absorbed into the dehumidifying agent 140, dehumidification efficiency of the dehumidifying agent 140 is reduced. A smaller interior volume of the inside-air suction path 131 may be advantageous to reduce the amount of condensed water produced in the inside-air suction path 131. Accordingly, the inside-air suction path 131 may have a smaller length in an air flow direction and a smaller cross sectional area. The dishwasher 1 employs the dehumidifying agent 140 made of a high molecular weight material as will be described hereinafter. The dehumidifying agent 140 made out of a high molecular weight material may suction a sufficient amount of air for dehumidification even if the inside-air suction path 131 has a small cross sectional area. In addition, a heat insulator (not shown) may be provided around the inside-air suction path 131 to reduce heat transfer between the inside-air suction path 131 and the outside.

To prevent water, generated via condensation of waster vapor in the inside-air suction path 131, from entering the inside/outside air movement path 133, the lower surface of the inside-air suction path 131 is inclined downward to the inside-air suction path 131 by a predetermined angle. The inclined lower surface of the inside-air suction path 131 guides the condensed water to the at least one inside-air suction hole 110, causing the water to be discharged into the wash tub 20.

To prevent the condensed water from being forced upward to enter the inside/outside air movement path 133 by movement of air passing through the inside-air suction path 131, the inside-air suction path 131 includes a water-flow preventing protrusion 135. The water-flow preventing protrusion 135 is formed at the lower surface of the inside-air suction path 131, and may also be formed at an upper surface of the inside-air suction path 131.

The dehumidifying agent 140 is located in the inside/outside air movement path 133. The air inside of the wash tub 20 containing water vapor passes through the dehumidifying agent 140 located in the inside/outside air movement path 133. As the dehumidifying agent 140 absorbs the water vapor contained in the air, the resulting dry air is discharged into the wash tub 20 through the inside-air discharge hole 115.

As illustrated in FIGS. 5A and 5B, the dishwasher 1 according to the embodiment employs the dehumidifying agent 140 made of a high molecular weight material. A high molecular weight material may absorb more water per unit mass than a zeolite-silica-based porous material. Thus, the dehumidifying agent 140 may be advantageous in view of space utilization because a reduced installation space is required. In addition, the high molecular weight dehumidifying agent 140 has smaller thermal energy required for dehumidification than the porous material, resulting in reduced energy consumption of the dishwasher 1. The dehumidifying agent 140 is fabricated by stacking a plurality of dehumidifying sheets 141 made out of the high molecular weight material, one above another to form a honeycomb cross section. With this configuration, the dehumidifying agent 140 may apply smaller flow resistance to the air passing therethrough than the porous material. Thus, dehumidifying efficiency may be enhanced when the dehumidifying agent 140 is elongated in an air flow direction.

The dehumidifying agent 140 may be fabricated in such a manner that a heating member 142 is provided between the dehumidifying sheets 141 stacked one above another. The heating member 142 provides heat energy required to absorb moisture for regeneration and to dry the dehumidifying agent 140. The heating member 142 provided in the dehumidifying agent 140 may replace a heater 160 that will be described hereinafter. In addition, the heating member 142 serves to heat air outside of the wash tub 20 passing through the dehumidifying agent 140, thereby indirectly providing heat energy to the dehumidifying agent 140. This may reduce energy consumption required to regenerate the dehumidifying agent 140.

A suction path change device 150 communicates only one of the inside-air suction path 131 and the outside-air suction path 132 with the inside/outside air movement path 133 at once. The suction path change device 150 may open the inside-air suction path 131 and close the outside-air suction path 132 during drying process, thereby preventing air outside of the wash tub 20 from entering the inside/outside air movement path 133. Conversely, the suction path change device 150 may open the outside-air suction path 132 and close the inside-air suction path 131 during regeneration process, thereby allowing air outside of the wash tub 20 from entering the inside/outside air movement path 133.

The suction path change device 150 includes at lease one inside-air suction path shutter 151 having a cross section corresponding to that of the inside-air suction path 131, and an outside-air suction path shutter 152 having a cross section corresponding to that of the outside-air suction path 132. The inside-air suction path shutter 151 and the outside-air suction path shutter 152 may be coupled to each other on a single shaft to have a predetermined angle therebetween, thereby being integrally operated with each other. Alternatively, the inside-air suction path shutter 151 and the outside-air suction path shutter 152 may be operated independently.

A first drive device 153 is mounted to the suction path change device 150 and operates the suction path change device 150 according to the drying or regeneration process. When the inside-air suction path shutter 151 and the outside-air suction path shutter 152 are coupled to each other on a single shaft, only one of the inside-air suction path shutter 151 and the outside-air suction path shutter 152 may be opened at once as the first drive device 153 rotates the shaft. When the inside-air suction path shutter 151 and the outside-air suction path shutter 152 are operated independently, a plurality of first drive devices 153 may be provided.

A discharge path change device 170 guides air to the inside-air discharge hole 115 during drying process and to the outside-air discharge hole 125 during regeneration process. A second drive device 171 is mounted to the discharge path change device 170 and operates the discharge path change device 170 according to the drying or regeneration process.

The heater 160 heats air introduced into the drying duct 100. The heater 160 is located in the outside-air suction path 132 to supply heat energy required for regeneration process. In this case, since the heater 160 comes into contact with dry outside air, it may prevent water vapor from condensing on a surface of the heater 160. The air outside of the wash tub 20 suctioned into the outside-air suction hole 120, is heated by the heater 160 prior to being introduced into the inside/outside air movement path 133. The heated air passes through the dehumidifying agent 140 located in the inside/outside air movement path 133, thereby acting to dry the dehumidifying agent 140.

Alternatively, the heater 160 may be located in the inside/outside air movement path 133. It may be necessary to locate the heater 160 upstream of the dehumidifying agent 140. In this case, both the inside air and the outside air of the wash tub 20 pass through the heater 160. During regeneration process, the heater 160 may need to heat the outside air for drying the dehumidifying agent 140.

To prevent overheating of the heater 160, a Photometric Calibration Target (PCT) type heater may be used such that a surface temperature of the heater 160 is controlled to be less than 120° C. In this case, a separate safety device to prevent overheating of the heater 160 may not be necessary.

circulating fan 180 is provided in the drying duct 100 to enable suction and discharge of air. The circulating fan 180 is located in the inside/outside air movement path 133 downstream of the dehumidifying agent 140 in consideration of the fact that air encounters a flow resistance while passing through the dehumidifying agent 140. In addition, in consideration of the volume of the circulating fan 180, the circulating fan 180 is disposed in a space between a lower surface of the wash tub 20 and a bottom surface of the main body 10. In this case, a region of the inside/outside air movement path 133 where the circulating fan 180 is located is configured such that a suction side of the circulating fan 180, located in the space between the lower surface of the wash tub 20 and the bottom surface of the main body 10, protrudes leftward or rightward of the wash tub 20.

FIGS. 6A to 6G are views illustrating air paths depending on arrangements of the dehumidifying agent in the dishwasher according to the embodiment.

Figure 6A:
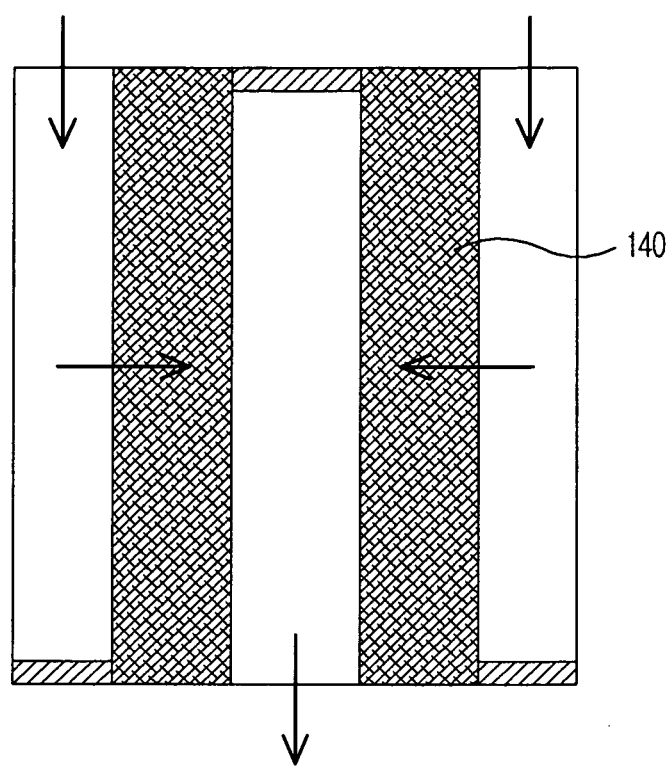
FIGS. 6A to 6G are views illustrating air paths depending on arrangements of the dehumidifying agent in the dishwasher according to the embodiment.

FIG. 6A illustrates a first arrangement scheme of the dehumidifying agent 140 in which two separated suction paths and left and right dehumidifying agents 150 are longitudinally arranged. The separated suction paths may allow the two dehumidifying agents 140 to uniformly absorb water vapor and prevent condensed water introduced into the suction paths from being directly absorbed into the dehumidifying agents 140.

Figure 6B:
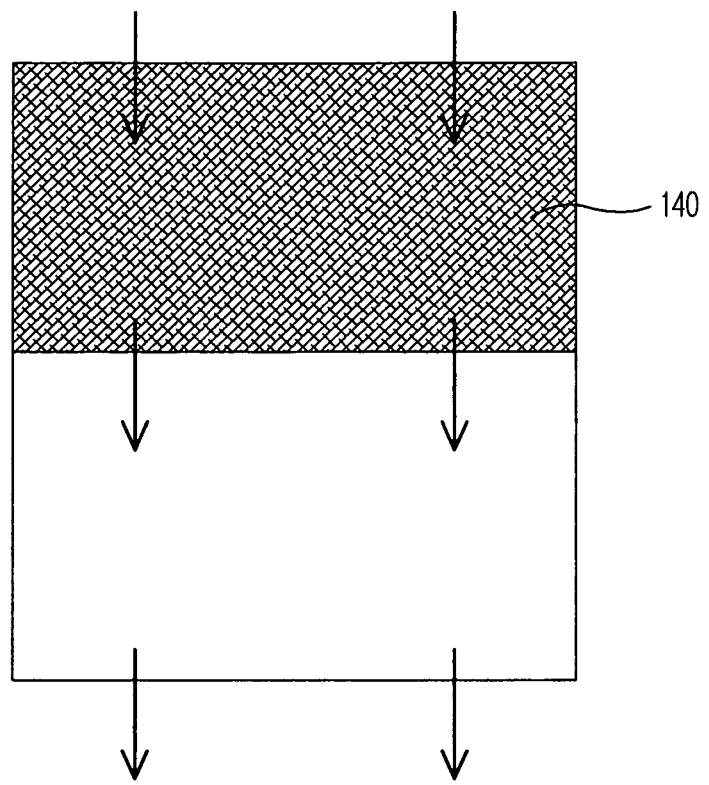

FIG. 6B illustrates a second arrangement scheme of the dehumidifying agent 140 in which a single dehumidifying agent 140 is disposed transversely in an upper region and a space below the dehumidifying agent 140 is empty. In this case, air passes through the single dehumidifying agent 140 alone.

Figure 6C:
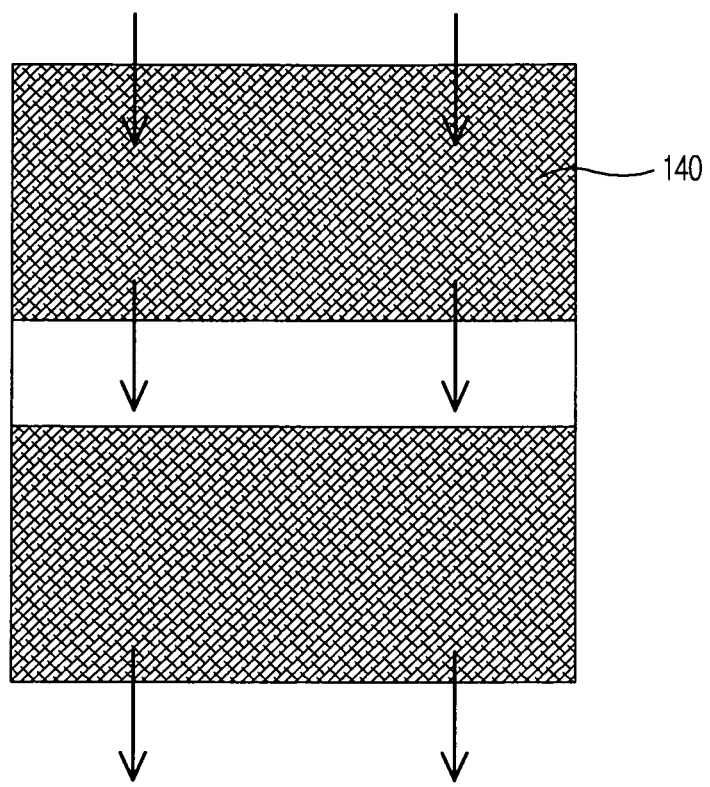

FIG. 6C illustrates a third arrangement scheme of the dehumidifying agent 140 in which two dehumidifying agents 140 are arranged with a predetermined interval therebetween. The third scheme provides a greater amount of the dehumidifying agent 140 as compared to the second scheme and may absorb greater amount of water vapor.

Figure 6D:
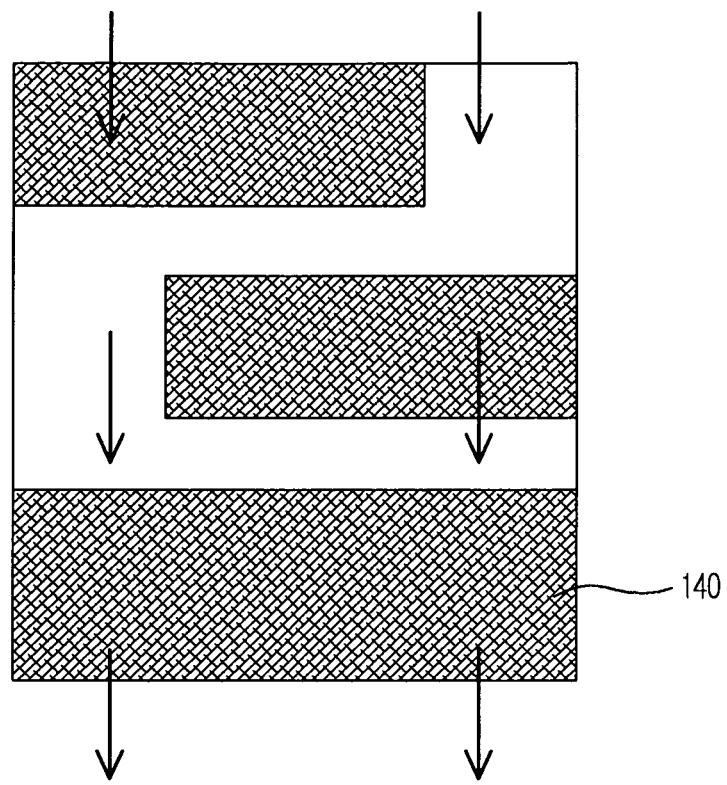
Figure 6E:
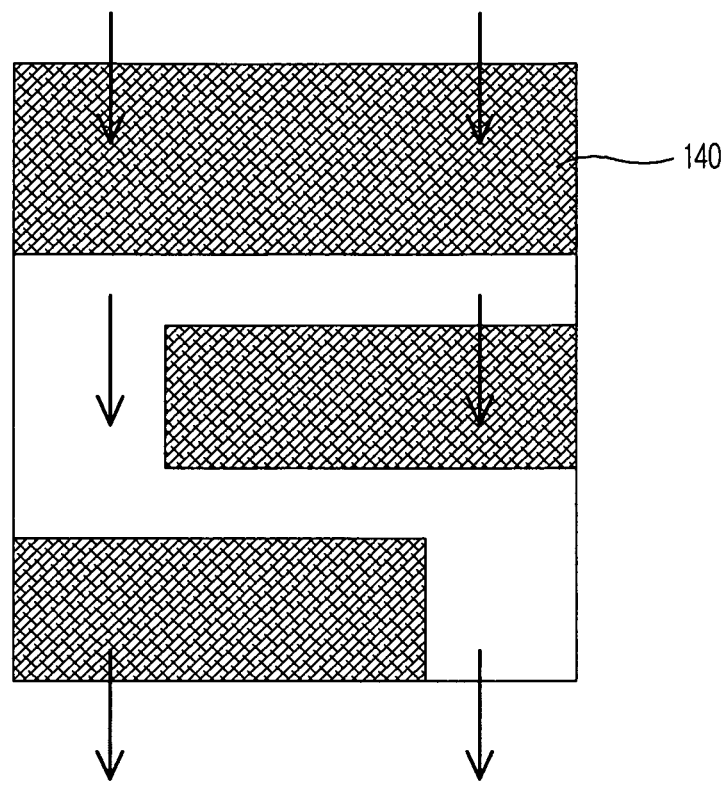

FIGS. 6D and 6E respectively illustrate fourth and fifth arrangement schemes of the dehumidifying agent 140 in which three dehumidifying agents 140 are spaced apart from one another by a predetermined distance. In this case, two dehumidifying agents 140 may have a smaller transversal length than that of the other dehumidifying agent 140 such that some air does not pass through any one of two smaller dehumidifying agents 140. The fourth and fifth schemes may ensure that the three dehumidifying agents 140 uniformly absorb water vapor contained in the air. When the plurality of dehumidifying agents 140 uniformly absorb water vapor, the dehumidifying agents 140 may be efficiently dried during regeneration process and this may reduce a drying time.

Figure 6F:
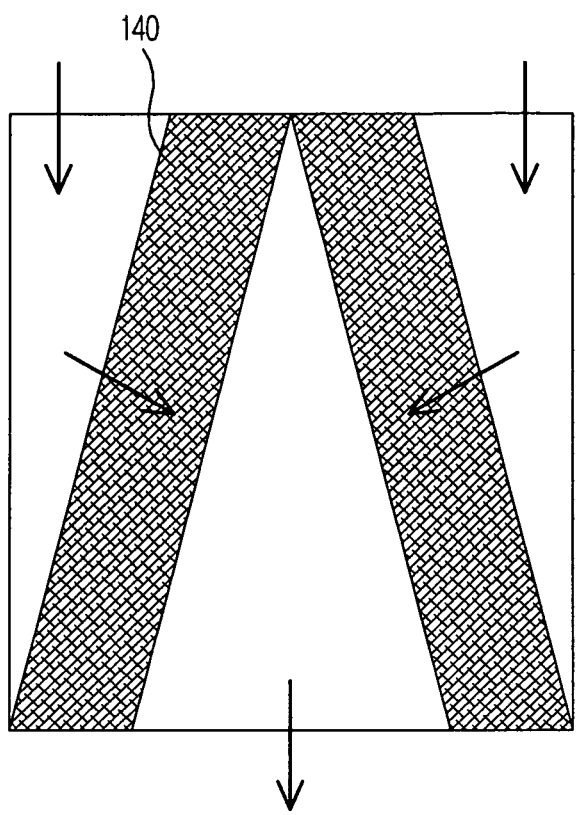
Figure 6G:
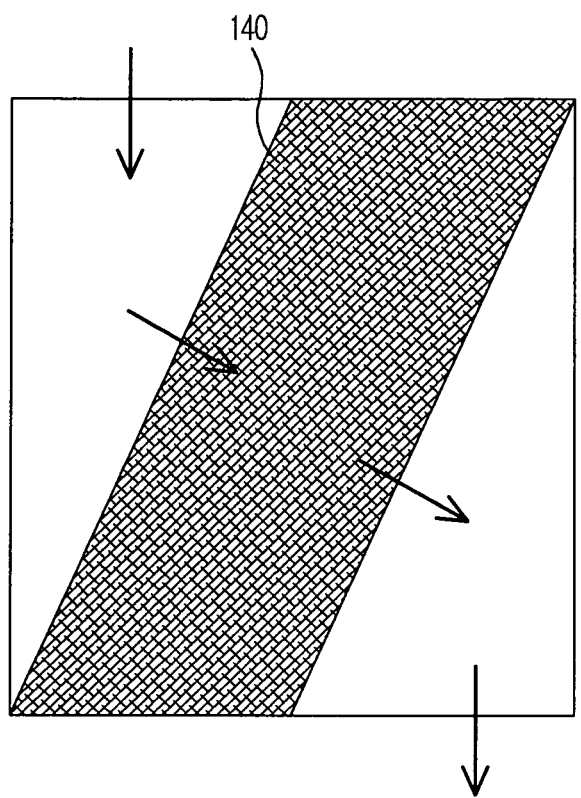

FIGS. 6F and 6G respectively illustrate sixth and seventh arrangement schemes of the dehumidifying agent 140. The sixth scheme may provide a greater amount of the dehumidifying agent 140 than the first scheme. In addition, a suction path is narrowed downward to allow the single dehumidifying agent 140 to uniformly absorb water vapor. As illustrated in the seventh scheme, a single suction path and a single discharge path may be provided.

Figure 7A:
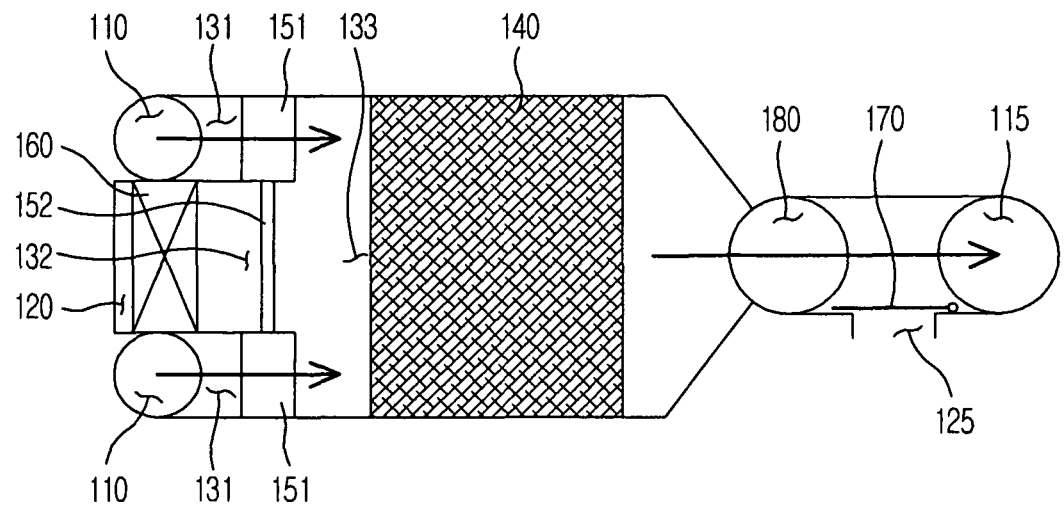
FIG. 7A is a view illustrating a drying process of the dishwasher according to the embodiment.
Figure 7B:
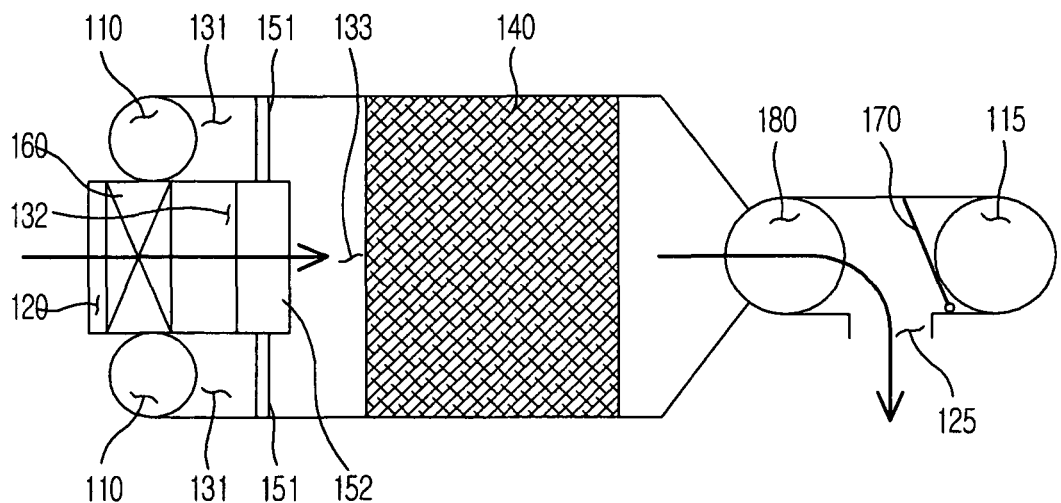
FIG. 7B is a view illustrating a regeneration process of the dishwasher according to the embodiment.

FIGS. 7A and 7B are views illustrating the drying process and the regeneration process of the dishwasher according to an embodiment.

As illustrated in FIG. 7A, if a drying process begins, the inside-air suction path 131 communicates with the inside/outside air movement path 133 and the outside-air suction path shutter 152 disconnects the outside-air suction path 132 from the inside/outside air movement path 133. Also, the discharge path change device 170 closes the outside-air discharge hole 125 so as to guide air to the inside-air discharge hole 115.

Air inside of the wash tub 20 containing water vapor is suctioned into the inside-air suction path 131 through the at least one inside-air suction hole 110 by the circulating fan 180. The suctioned air comes into contact with the dehumidifying agent 140 located in the inside/outside air movement path 133, allowing the water vapor contained in the suctioned air to be absorbed into the dehumidifying agent 140. After the water vapor is removed from the air passing through the dehumidifying agent 140, the resulting dried air is discharged into the wash tub 20 through the inside-air discharge hole 115. This cycle is repeated until the air inside of the wash tub 20 is completely dried.

When the flow rate of air inside of the wash tub 20 circulating through the drying duct 100 and the wash tub 20 is increased, it may reduce a time required to completely dry the interior of the wash tub 20. The air inside of the wash tub 20 is slowed while passing through the dehumidifying agent 140 received in the drying duct 100. For example, a dehumidifying agent made out of porous material has a high flow resistance and thus, limits the flow rate of air. In the dishwasher 1 of the embodiment, owing to the use of a high molecular weight dehumidifying agent, it may be possible to increase the flow rate of air, achieving a reduced drying time. An average velocity of air passing through the dehumidifying agent 140 is greater than at least 0.7 m/s, for example.

As illustrated in FIG. 7B, if a regeneration process begins, the outside-air suction path 132 communicates with the inside/outside air movement path 133 and the inside-air suction path shutter 151 disconnects the inside-air suction path 131 from the inside/outside air movement path 133. The discharge path change device 170 opens the outside-air discharge hole 125 to guide air to the outside-air discharge hole 125.

Dry air outside of the wash tub 20 is suctioned into the outside-air suction path 132 through the outside-air suction hole 120 by the circulating fan 180. The heater 160 is operated only after a predetermined time passes from a regeneration beginning time, and initially, the unheated outside air dries the dehumidifying agent 140. Since the dehumidifying agent 140 contains a great amount of moisture in an initial regeneration process stage, even the unheated outside air, for example, at room-temperature may effectively dry the dehumidifying agent 140. Also, since the initial regeneration process may be performed simultaneously with a main washing process that uses high-temperature wash water, the interior temperature of the wash tub 20 may be raised to 40° C., for example. Thus, waste heat generated during the main washing process may raise the temperature of the peripheral air, enabling effective drying of the dehumidifying agent 140 even without operation of the heater 160.

The heater 160 may be operated after a predetermined time passes, thereby heating the suctioned air so as to raise the temperature of the suctioned air. The temperature of the heated air may be, for example, 70° C. or less to reduce power consumption because the high molecular weight dehumidifying agent 140 may be regenerated even using the air having a temperature of, for example, 70° C. or less. In this case, the temperature of the air passes through the dehumidifying agent 140 may be lowered to, for example, 40° C. or less, thus preventing items in the vicinity thereof from being damaged by the air discharged out of the dishwasher 1. The heated air comes into contact with the dehumidifying agent 140 located in the inside/outside air movement path 133, and the water stored in the dehumidifying agent 140 undergoes phase change upon receiving heat energy from the heated air. The air containing water vapor is discharged out of the wash tub 20 through the outside-air discharge hole 125.

Figure 8A:
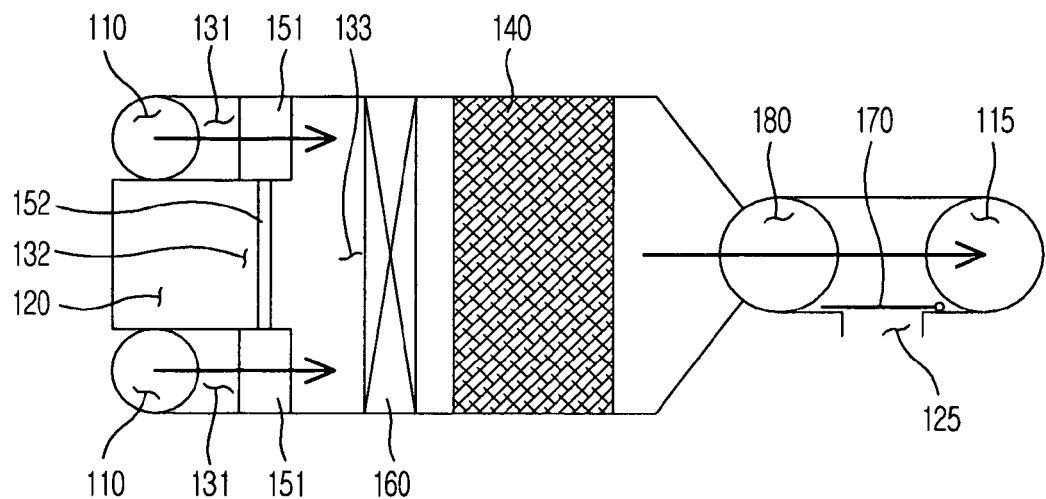
FIG. 8A is a view illustrating a drying process of the dishwasher according to another embodiment.
Figure 8B:
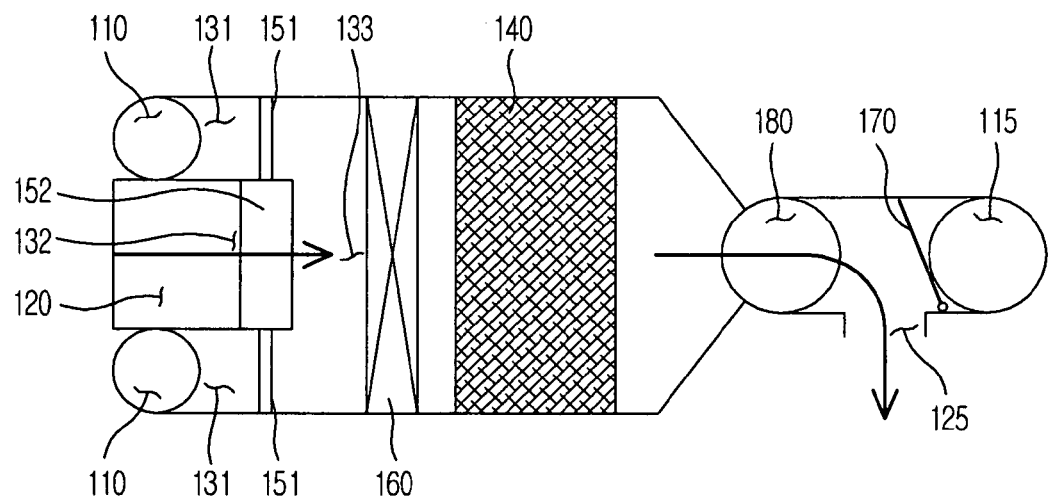
FIG. 8B is a view illustrating a regeneration process of the dishwasher according to another embodiment.

FIGS. 8A and 8B are views illustrating the drying process and the regeneration process of the dishwasher according to another embodiment.

As illustrated in FIGS. 8A and 8B, the heater 160 may be located in the inside/outside air movement path 133 such that air passes through the dehumidifying agent 140 after coming into contact with the heater 160 during both drying and regeneration processes.

As is apparent from the above description, in a dishwasher according to the embodiments, at least one dehumidifying agent made of a high molecular weight material having high dehumidification efficiency is used, resulting in enhanced drying efficiency of the dishwasher. Further, the dehumidifying agent occupies a reduced installation space, enabling efficient arrangement of mechanical devices of the dishwasher and consequently, providing the dishwasher with an increased interior washing space.

Furthermore, the dehumidifying agent may be regenerated using less energy than in conventional cases, resulting in reduced energy consumption.

Although a few embodiments have been shown and described, it would be appreciated by those skilled in the art that changes may be made in these embodiments without departing from the principles and spirit of the invention, the scope of which is defined in the claims and their equivalents.

What is claimed is:
1. A dishwasher comprising:
a main body;
a wash tub provided in the main body;
a drying duct including a plurality of inside-air suction holes and an inside-air discharge hole communicating with interior of the wash tub, and an outside-air suction hole and an outside-air discharge hole communicating with outside of the wash tub; and
at least one dehumidifying agent placed in the drying duct,
wherein the drying duct internally defines a plurality of inside-air suction paths communicating with each of the plurality of inside-air suction holes such that air inside of the wash tub is suctioned thereinto, an outside-air suction path communicating with the outside-air suction hole such that air outside of the wash tub is suctioned thereinto and an inside/outside air movement path communicating with the plurality of inside-air suction paths and the outside-air suction path,
wherein the dishwasher further comprising a suction path change device configured to open and close the plurality of inside-air suction paths and the outside-air suction path to selectively communicate any one of the plurality of inside-air suction paths and the outside-air suction path with the inside/outside air movement path,
wherein the suction path change device includes a plurality of inside-air suction path shutters, each of the plurality of inside-air suction path shutters having a shutter surface corresponding to a cross section of each of the plurality of inside-air suction paths, and an outside-air suction path shutter having a shutter surface corresponding to a cross section of the outside-air suction path, and wherein each of the inside air suction paths arranged on opposite sides of the outside air suction path, and the plurality of the inside-air suction path shutters and the outside-air suction path shutter are connected to each other on a single shaft to have a predetermined angle therebetween.

2. The dishwasher according to claim 1, wherein the outside-air suction hole is configured to allow the air outside of the wash tub to be suctioned into the drying duct along an outer surface of the main body.

3. The dishwasher according to claim 1, wherein the plurality of inside-air suction holes communicate with an upper surface of the wash tub, and the inside-air discharge hole communicates with a left or right surface of the wash tub.

4. The dishwasher according to claim 1, further comprising a circulating fan mounted in the drying duct,
wherein the circulating fan is located between a lower surface of the wash tub and a bottom surface of the main body.

5. The dishwasher according to claim 1, further comprising a heater to heat outside air suctioned into the drying duct.

6. The dishwasher according to claim 1, further comprising a water-intercepting member connected to the plurality of inside-air suction holes to prevent wash water from entering the drying duct.

7. The dishwasher according to claim 1, wherein the at least one dehumidifying agent includes a stack of dehumidifying sheets made out of a high molecular weight material and elongated in an air flow direction.

8. The dishwasher according to claim 7, wherein the stack of the dehumidifying sheets has a honeycomb cross section.

9. The dishwasher according to claim 7, wherein the stack of the dehumidifying sheets includes at least one heating member.

10. The dishwasher according to claim 1, wherein an average velocity of air passing through the at least one dehumidifying agent is approximately 0.7 m/s or more.

11. The dishwasher according to claim 5, wherein the heater is operated after a predetermined time passes from a regeneration beginning time.

12. The dishwasher according to claim 5, wherein the heater is located near the outside-air suction hole.

13. The dishwasher according to claim 5, wherein a temperature of air heated by the heater is approximately 70° C. or less.

14. A dishwasher comprising:
a main body;
a wash tub placed in the main body and including an air suction hole and an air drain hole;
a drying duct including a plurality of inside-air suction holes communicating with the air drain hole, an inside-air discharge hole communicating with the air suction hole, and an outside-air suction hole and an outside-air discharge hole communicating with outside of the wash tub;
at least one dehumidifying agent to remove moisture from air suctioned into the plurality of inside-air suction holes;
a plurality of inside-air suction paths defined in the drying duct so as to communicate with each of the plurality of inside-air suction holes;
an outside-air suction path defined in the drying duct so as to communicate with the outside-air suction hole;
an inside/outside air movement path communicating with the plurality of inside-air suction paths and the outside-air suction path;
a suction path change device configured to open and close the plurality of inside-air suction paths and the outside-air suction path to selectively communicate any one of the plurality of inside-air suction paths and the outside-air suction path with the inside/outside air movement path; and
a partition to guide movement of air suctioned into the drying duct,
wherein the partition is placed between one of the plurality of inside-air suction paths and the outside-air suction path,
wherein the suction path change device includes a plurality of inside-air suction path shutters, each having the plurality of inside-air suction path shutters having a shutter surface corresponding to a cross section of each of the plurality of inside-air suction paths, and an outside-air suction path shutter having a shutter surface corresponding to a cross section of the outside-air suction path, and
wherein each of the inside-air suction paths arranged on opposite sides of the outside air suction path, and the plurality of the inside-air suction path shutters and the outside-air suction path shutter are connected to each other on a single shaft to have a predetermined angle there between.

15. A dishwasher comprising:
a main body;
a wash tub placed in the main body and including an air suction hole and an air drain hole;
a drying duct including a plurality of inside-air suction holes communicating with the air drain hole, an inside-air discharge hole communicating with the air suction hole, and an outside-air suction hole and an outside-air discharge hole communicating with outside of the wash tub;
at least one dehumidifying agent to remove moisture from air suctioned into the plurality of inside-air suction holes;
a plurality of inside-air suction paths communicating with each of the plurality of inside-air suction holes such that air inside of the wash tub is suctioned thereinto;
an outside-air suction path communicating with the outside-air suction hole such that air outside of the wash tub is suctioned thereinto;
an inside/outside air movement path communicating with the plurality of inside-air suction paths and the outside-air suction path; and
a suction path change device configured to open and close the plurality of inside-air suction paths and the outside-air suction path to selectively communicate any one of the plurality of inside-air suction paths and the outside-air suction path with the inside/outside air movement path,
wherein the drying duct includes a base defining a lower surface, a cover defining an upper surface, and a partition to divide an interior space defined by the base and the cover,
wherein the plurality of inside-air suction paths and the outside-air suction path are defined in the interior space, and
wherein the plurality of inside-air suction paths and the outside-air suction path have at least one of the base and the partition in common, wherein the suction path change device includes a plurality of inside-air suction path shutters, each of the plurality of inside-air suction path shutters having a shutter surface corresponding to a cross section of each of the plurality of inside-air suction paths, and an outside-air suction path shutter having a shutter surface corresponding to a cross section of the outside-air suction path, and wherein each of the inside-air suction paths arranged on opposite sides of the outside-air suction path, and the plurality of the inside-air suction path shutters and the outside-air suction path shutter are connected to each other on a single shaft to have a predetermined angle therebetween.

* * * * *